United States Patent [19]
Wang

[11] Patent Number: 5,743,018
[45] Date of Patent: Apr. 28, 1998

[54] PRUNING SHEAR DEVICE

[76] Inventor: Meng Tun Wang, No. 9-4-1, Chung Nan Lane, Tai Ping City, Taichung Hsien, Taiwan

[21] Appl. No.: 813,057

[22] Filed: Mar. 7, 1997

[51] Int. Cl.$^6$ ..................................... B26B 13/06
[52] U.S. Cl. ................................. 30/249; 30/231
[58] Field of Search ................... 30/249, 231, 166.3, 30/244, 245, 246

[56] References Cited

U.S. PATENT DOCUMENTS

| | | | |
|---|---|---|---|
| 4,420,883 | 12/1983 | Wallace et al. | 30/251 |
| 4,649,646 | 3/1987 | Lemcke | 30/249 |
| 4,760,645 | 8/1988 | Davis | 30/249 |
| 5,634,276 | 6/1997 | Lin | 30/249 |

*Primary Examiner*—Hwei-Siu Payer

[57] ABSTRACT

A pruning shear device includes a hook formed on the upper portion of a handle for engaging with a tree limb. A bar has one end pivotally coupled to the handle and bar an oblong bole. A cutter blade is pivotally coupled to the handle and has a free end slidably engaged in the oblong hole of the bar. A lever has one end pivotally coupled to the handle and a link pivotally couples the middle portion of the lever to the bar for allowing the lever to rotate the bar and the cutter blade with less force.

1 Claim, 5 Drawing Sheets

PRUNING SHEAR DEVICE

BACKGROUND OF THE INVENTION

1. Field of the Invention

The present invention relates to a shear, and more particularly to a pruning shear device.

2. Description of the Prior Art

One typical pruning shear device is disclosed in U.S. Pat. No. 4,420,883 to Wallace et al. and comprises a hook for hooking the tree limb. However, the user have to spend a great force for operating the shear device such that the shear device may not be easily operated by weak persons.

The present invention has arisen to mitigate and/or obviate the afore-described disadvantages of the conventional pruning shears.

SUMMARY OF THE INVENTION

The primary objective of the present invention is to provide a pruning shear device which includes a link assembly for allowing weak people to operate the pruning shears.

In accordance with one aspect of the invention, there is provided a pruning shear device comprising a handle including a hook provided on the upper portion for engaging with a tree limb, a bar including a first end pivotally coupled to the handle and including an oblong hole and including a second end, a cutter blade including a middle portion pivotally coupled to the handle at a pivot shaft for allowing the cutter blade to cut the tree limb, the cutter blade including a free end having a pin slidably engaged in the oblong hole of the bar, a lever including a first end pivotally coupled to the handle and including a middle portion, a link pivotally coupling the middle portion of the lever to the second end of the bar for allowing the lever to easily rotate the bar and the cutter blade, and means for biasing the cutter blade away from the hook.

In accordance with another aspect of the invention, there is provided a pruning shear device comprising a handle including a first end having a fixed jaw and having a projection, a hand grip pivotally coupled to the handle, a cutter blade pivotally coupled to the handle, a bar including a first end pivotally coupled to the cutter blade at a pivot axle and including an oblong hole and including a second end, and a link pivotally coupling the second end of the bar to the hand grip for allowing the hand grip to easily rotate the cutter blade.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
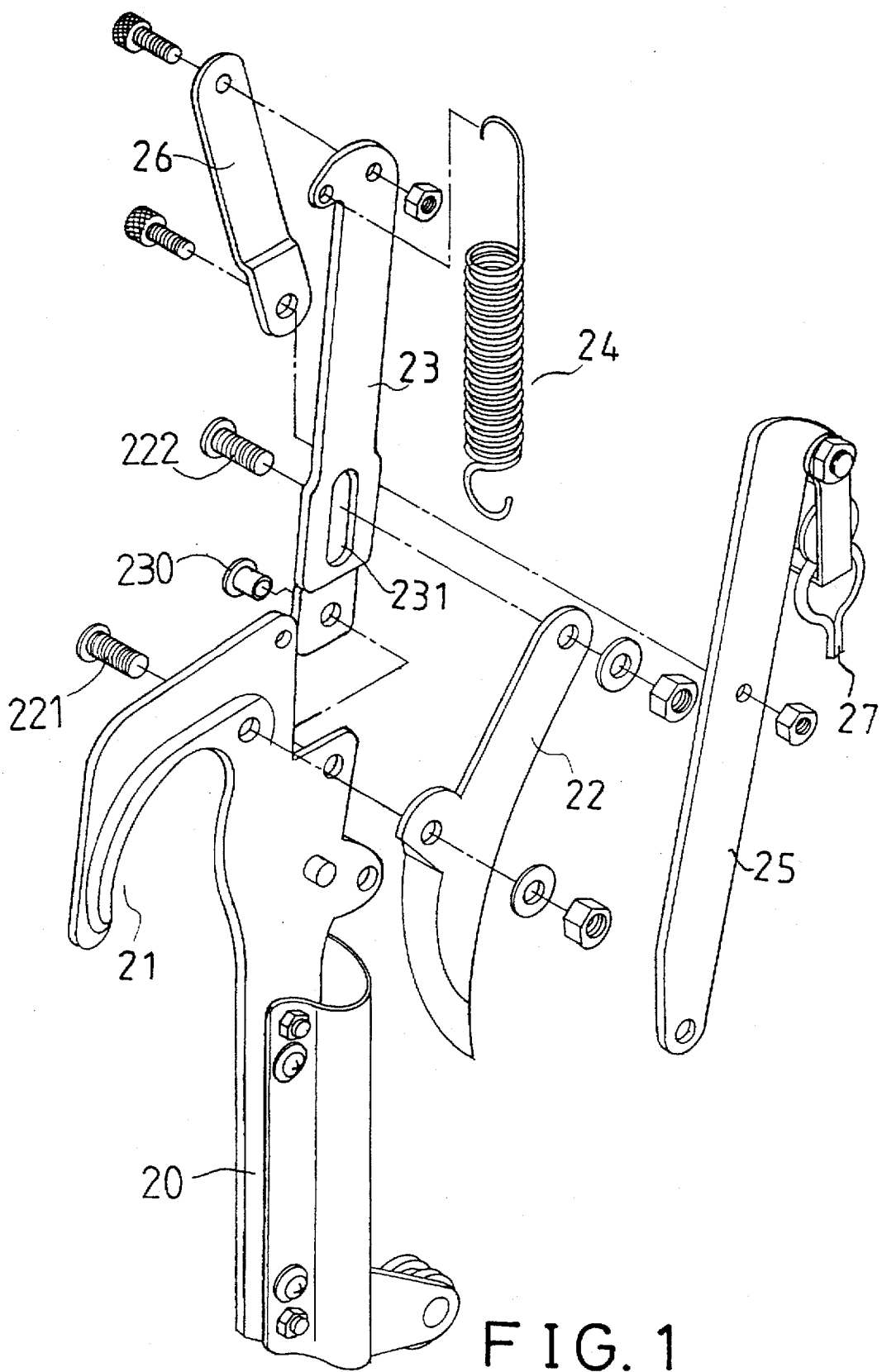
FIG. 1 is an exploded view of a pruning shear device in accordance with the present invention.
Figure 2:
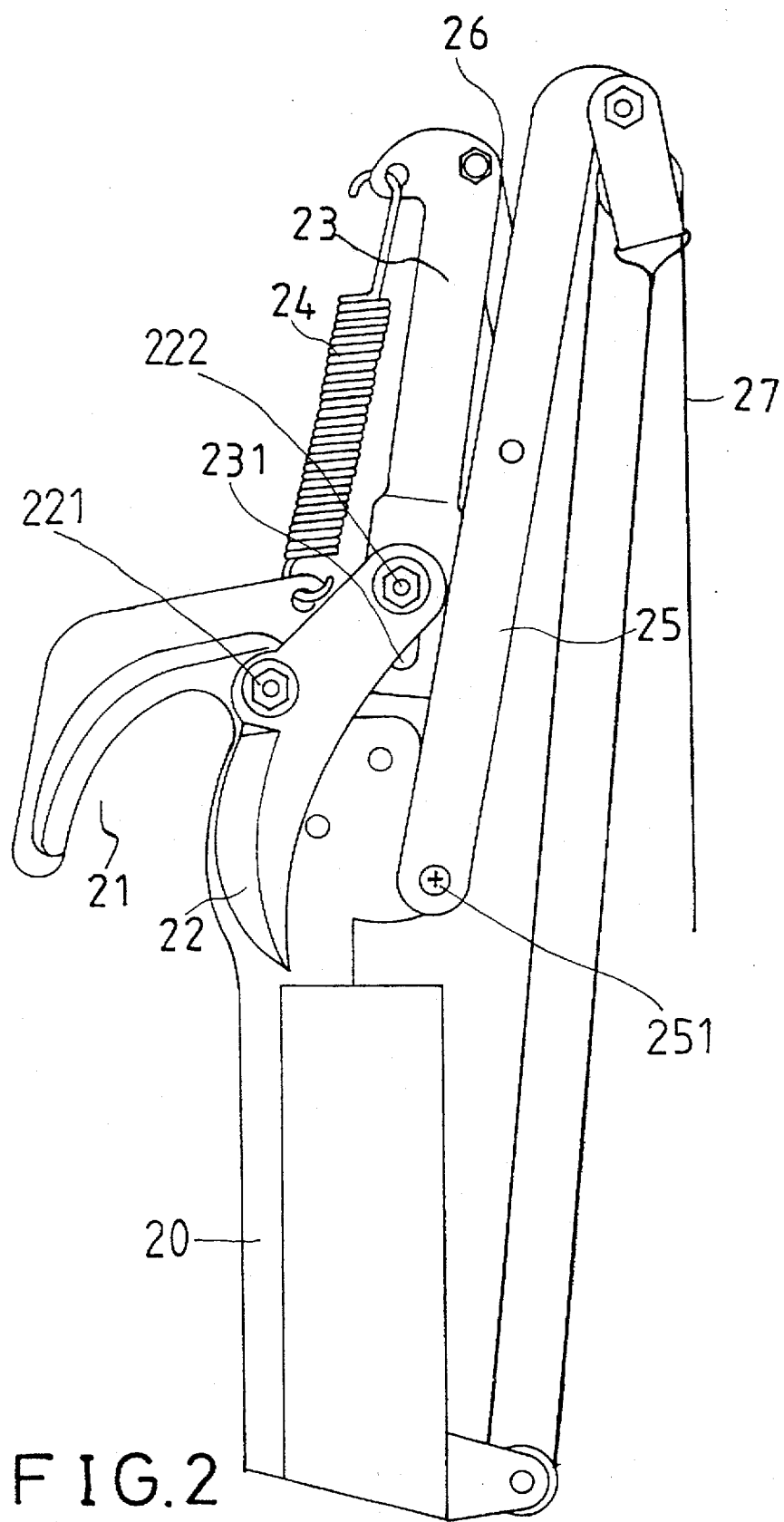
FIGS. 2 and 3 are plane views illustrating the operation of the pruning shear device.
Figure 3:
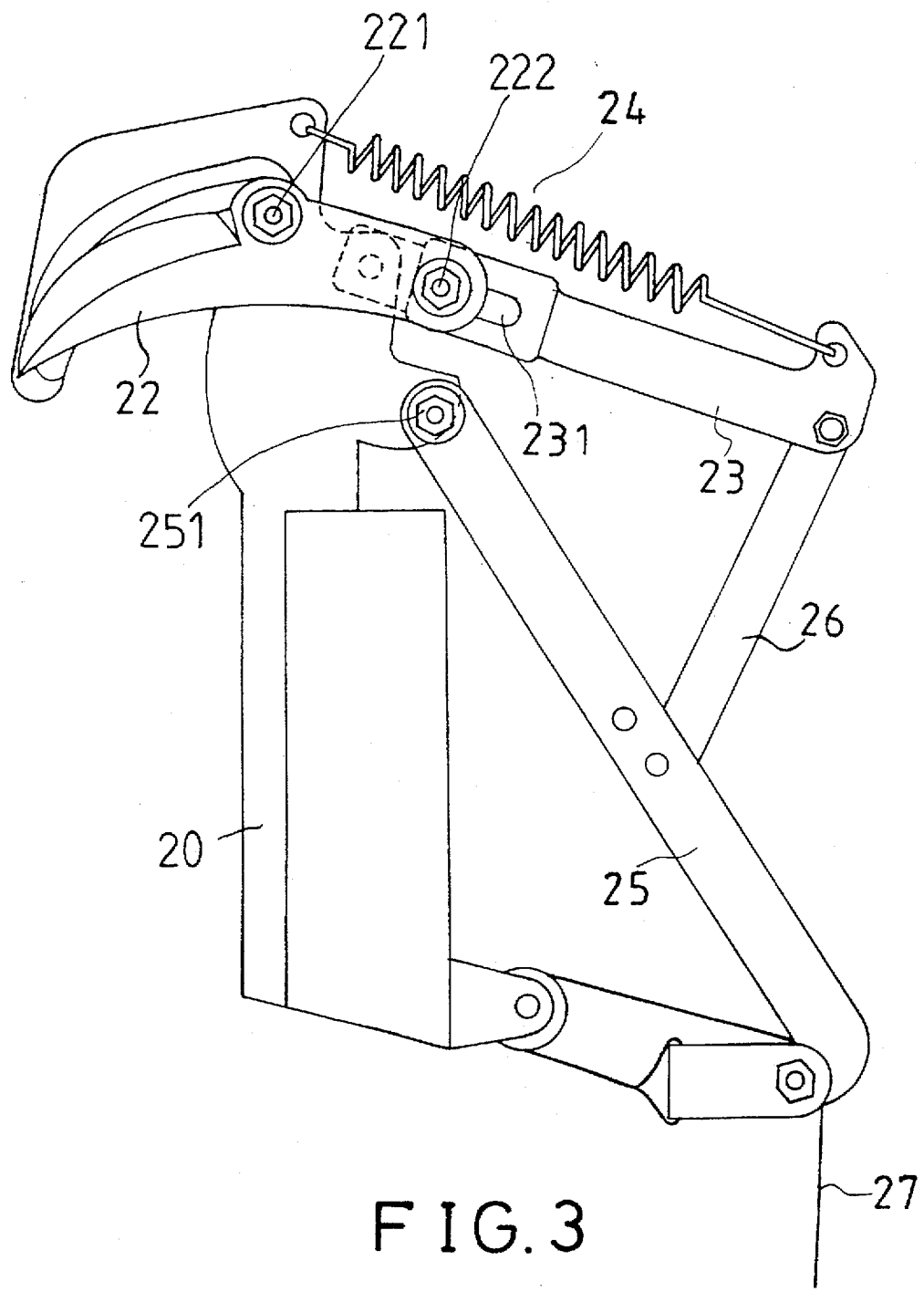

Referring to FIGS. 1–3, a pruning shear device comprises a body 20 including a hook 21 provided on the upper portion for engaging with tree limb. A cutter blade 22 has a middle portion pivotally coupled to the body 20 at a pivot shaft 221 for allowing the cutter blade 22 to cut the tree limb (FIG. 3). A bar 23 has one end pivotally coupled to the body 20 at a pin 230 and has an oblong hole 231. A pin 222 is secured to one end of the cutter blade 22 and slidably engaged in the oblong hole 231 of the bar 23. A lever 25 has one end pivotally coupled to the body 20 at a pivot axle 251 and has a rope and pulley assembly 27 coupled to the other end for rotating the lever 25. The rope and pulley assembly 27 has been disclosed in U.S. Pat. No. 4,420,883 to Wallace et al. and will not be described in further details. A link 26 couples the middle portion of the lever 25 to one end of the bar 23.

It is to be noted that the link 26 is coupled between the free end portion of the bar 23 and the middle portion of the lever 25 such that the cutter blade 22 and the bar 23 may be easily rotated by the lever 25 and the link 26 with less force. The pruning shear device may thus be easily operated by weak people. A spring 24 is coupled between the body 20 and the bar 23 for disengaging the cutter blade 22 from the hook 21 and the tree limb.

Figure 4:
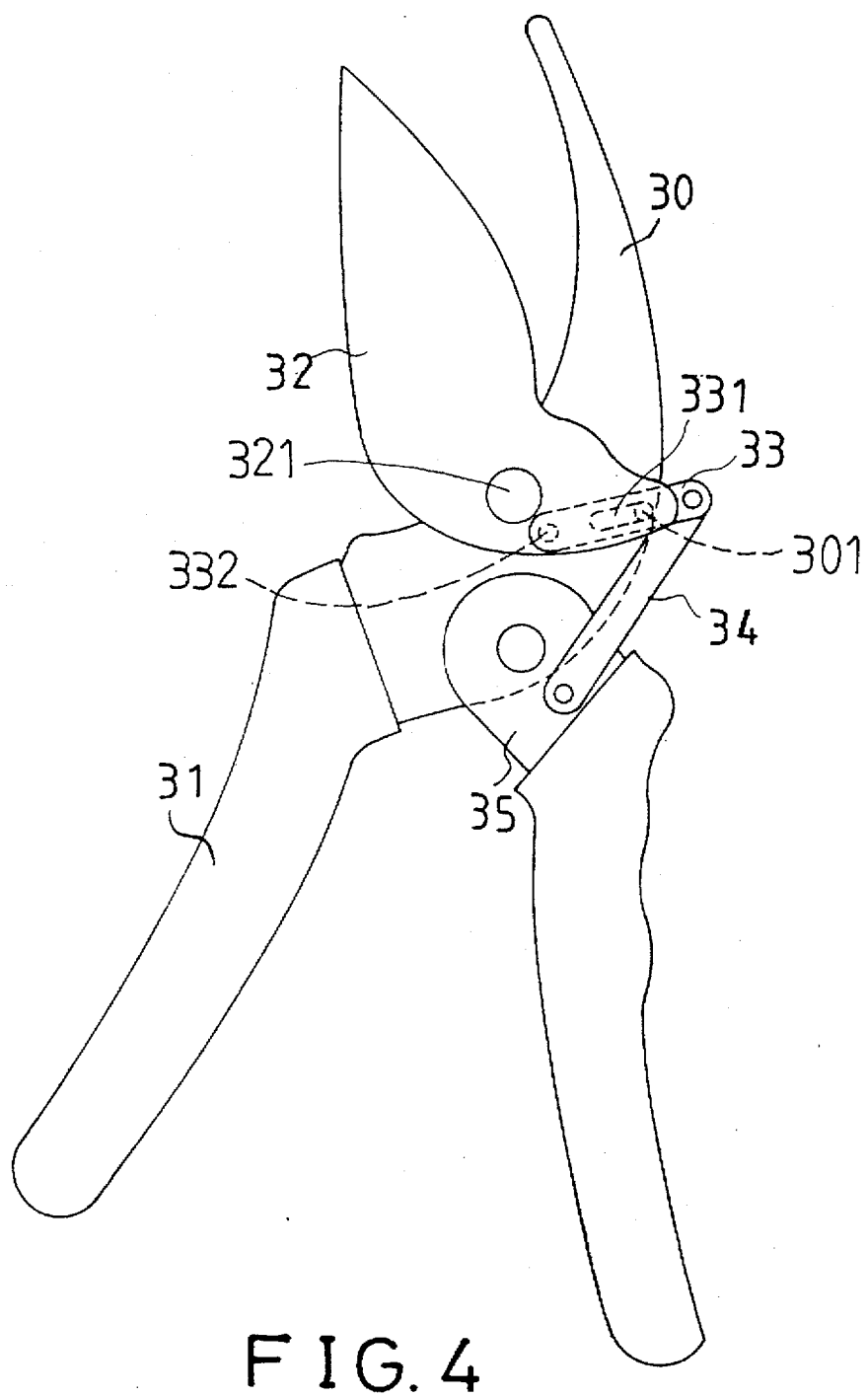
FIGS. 4 and 5 are plane views illustrating another application of the pruning shear device.
Figure 5:
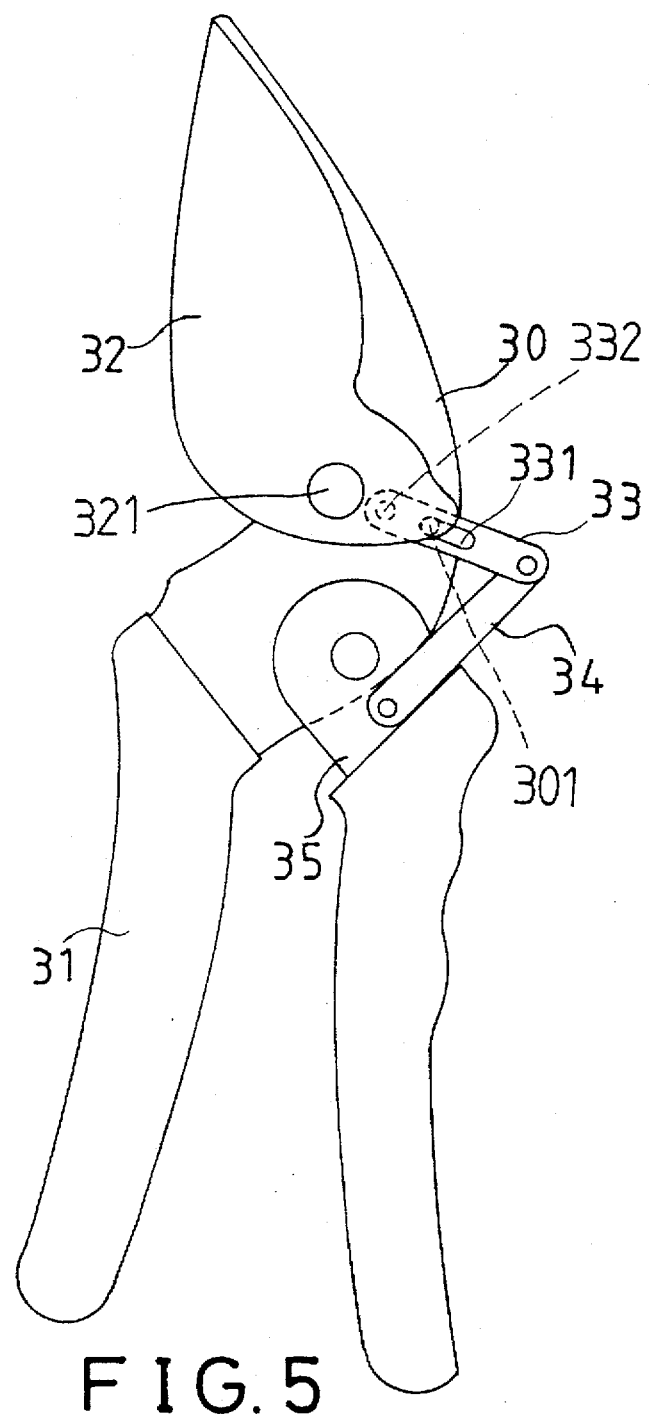

Referring next to FIGS. 4 and 5, a pair of pruning shears comprise a handle 31 having a fixed jaw 30 and a projection 301 provided on one end. A hand grip 35 is pivotally coupled to the handle 31 and a cutter blade 32 is pivotally coupled to the jaw 30 at a pivot shaft 321. A bar 33 has one end pivotally coupled to the cutter blade 32 at a pivot axle 332 and has an oblong hole 331 for slidably engaging with the projection 301. A link 34 is coupled between the hand grip 35 and the bar 33 for allowing the cutter blade 32 to be actuated with less force.

Accordingly, the pruning shear device includes a mechanism that may be easily operated with less force such that weak people may also easily operate the pruning shear device.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A pruning shear device comprising:

a handle including an upper portion, a hook provided on said upper portion of said handle for engaging with a tree limb, a bar including a first end pivotally coupled to said handle and including an oblong hole and including a second end, a cutter blade including a middle portion pivotally coupled to said handle at a pivot shaft for allowing said cutter blade to cut the tree limb, said cutter blade including a free end having a pin slidably engaged in said oblong hole of said bar, a lever including a first end pivotally coupled to said handle and including a middle portion, a link pivotally coupling said middle portion of said lever to said second end of said bar for allowing said lever to easily rotate said bar and said cutter blade, and means for biasing said cutter blade away from said hook.

* * * * *